United States Patent
Meert et al.

(10) Patent No.: US 6,816,937 B2
(45) Date of Patent: Nov. 9, 2004

(54) HOT SWAPPABLE ELECTRONIC MODULE WITH NON-STAGGERED CONNECTORS

(75) Inventors: Carl L. Meert, Sunnyvale, CA (US); Victor E. Jochiong, Mill Valley, CA (US); Raymond K. Ho, San Jose, CA (US); Kaamel M. Kermaani, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 477 days.

(21) Appl. No.: 09/893,102

(22) Filed: Jun. 27, 2001

(65) Prior Publication Data

US 2003/0005199 A1 Jan. 2, 2003

(51) Int. Cl.[7] .............................. G06F 13/00; H02H 9/00
(52) U.S. Cl. ....................................... 710/302; 710/304
(58) Field of Search ................................ 710/302–304, 710/301, 313; 713/300; 323/908; 307/147, 148, 130, 11, 125; 361/679, 683, 686, 58

(56) References Cited

U.S. PATENT DOCUMENTS

| | | | | |
|---|---|---|---|---|
| 5,210,855 A | * | 5/1993 | Bartol | 710/302 |
| 5,473,499 A | * | 12/1995 | Weir | 361/58 |
| 5,881,251 A | * | 3/1999 | Fung et al. | 710/302 |
| 5,886,431 A | * | 3/1999 | Rutigliano | 307/131 |
| 5,910,690 A | | 6/1999 | Dorsey et al. | |
| 6,452,794 B1 | * | 9/2002 | Rumney | 361/686 |
| 6,542,997 B1 | * | 4/2003 | Rolls et al. | 713/324 |

FOREIGN PATENT DOCUMENTS

EP        0 726 527 A1    8/1996

* cited by examiner

Primary Examiner—Gopal C. Ray
(74) Attorney, Agent, or Firm—Park, Vaughan & Fleming LLP

(57) ABSTRACT

A hot swappable electronic component or module is provided that has non-staggered connectors (i.e., of equal length or depth), but which is configured to ensure that power, signal or other connectors are electrically coupled in a desired order. The electronic component includes a switch (e.g., a field effect transistor) having a gate coupled to a ground line that is configured for coupling to a ground reference of the interface with which the component is mated. A source of the switch is coupled to a voltage input (e.g., power, Vcc) and a drain is coupled to an internal component load or circuit. Until the gate is coupled to ground, the switch remains open, thereby preventing spurious signals or feedback of damaging current to the interface. When the gate is coupled to ground, the switch is closed and the internal load or circuit is energized.

17 Claims, 3 Drawing Sheets

HOT SWAPPABLE ELECTRONIC MODULE WITH NON-STAGGERED CONNECTORS

BACKGROUND

This invention relates to the fields of electronics and computer systems. More particularly, an apparatus is provided for enabling an electronic module having non-staggered connector contacts to be installed live or hot (e.g., during operation of the system in which it is installed).

An electronic module or peripheral device that can be inserted or replaced in a system (e.g., a computer system) while the system is operating, or is live, may be considered hot swappable. The use of such modules allows the system to continue operation even while a failed module is replaced, thus limiting the amount of time that the system is unavailable due to maintenance.

Typical hot swappable components include signal connectors (e.g., pins, sockets) designed to mate with compatible connectors of an interface module, mid-plane assembly or system interface. The signal connectors thus provide for electrical connection between the circuitry of the component and corresponding circuitry of the system.

When the various circuits or circuit elements of a hot swappable component need to be connected or powered up in a particular sequence, the component is typically configured with staggered connectors. In other words, connectors for different signal lines or circuits may be of different lengths or depths, so that when the component is mated with the system the connectors make contact in the desired sequence. In particular, a ground connector may be longer than a power or input/output connector so that a ground reference is established before the component is energized.

The use of staggered connectors requires the hot swappable component and/or the system interface to which the component mates, to be specially configured to provide or allow for connectors of varying lengths. However, some interfaces or connector assemblies that may be used with a hot swappable component may employ uniformly sized connectors. Or, staggered connectors may be unavailable, unusable or not feasible for the component.

SUMMARY

Thus, in one embodiment of the invention an apparatus is provided for an electronic module or component having non-staggered connectors, to ensure that the module is connected or energized in a desired sequence. The apparatus may include one or more circuit elements configured to ensure a first connection (e.g., ground) is made before a second connection (e.g., power) is completed.

In an embodiment of the invention, an electronic module that is hot swappable, or to be inserted in a system while the system is live, is configured with a switch. The switch may comprise a mechanical switch or a solid-state switch such as a FET (Field Effect Transistor). A switch gate is coupled to ground and the switch therefore remains open until a ground connection is made between the module and the system. The switch is then closed and a connection between a source (e.g., power, Vcc) and the module's internal load or circuitry can be completed.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

In one embodiment of the invention an apparatus is provided for ensuring that lines or circuits of a hot swappable electronic module with non-staggered electrical connectors (i.e., connectors of substantially uniform length) are connected or energized in a desired sequence. The electronic module may comprise a peripheral component (e.g., storage device, input/output device), an assembly of electronic devices or circuits, an internal computer system module, and so on. The module may interface with (e.g., connect to) any portion of a computer or other system. The module is hot swappable in that it may be inserted or replaced while the system is live.

Because the module's connectors are of uniform length or depth, the desired sequence of signal/power connections is ensured through the use of a switching element within the module. Until a first connection is made (e.g., for ground), the switch remains open. When closed, a second connection (e.g., power, Vcc) is completed.

Figure 1:
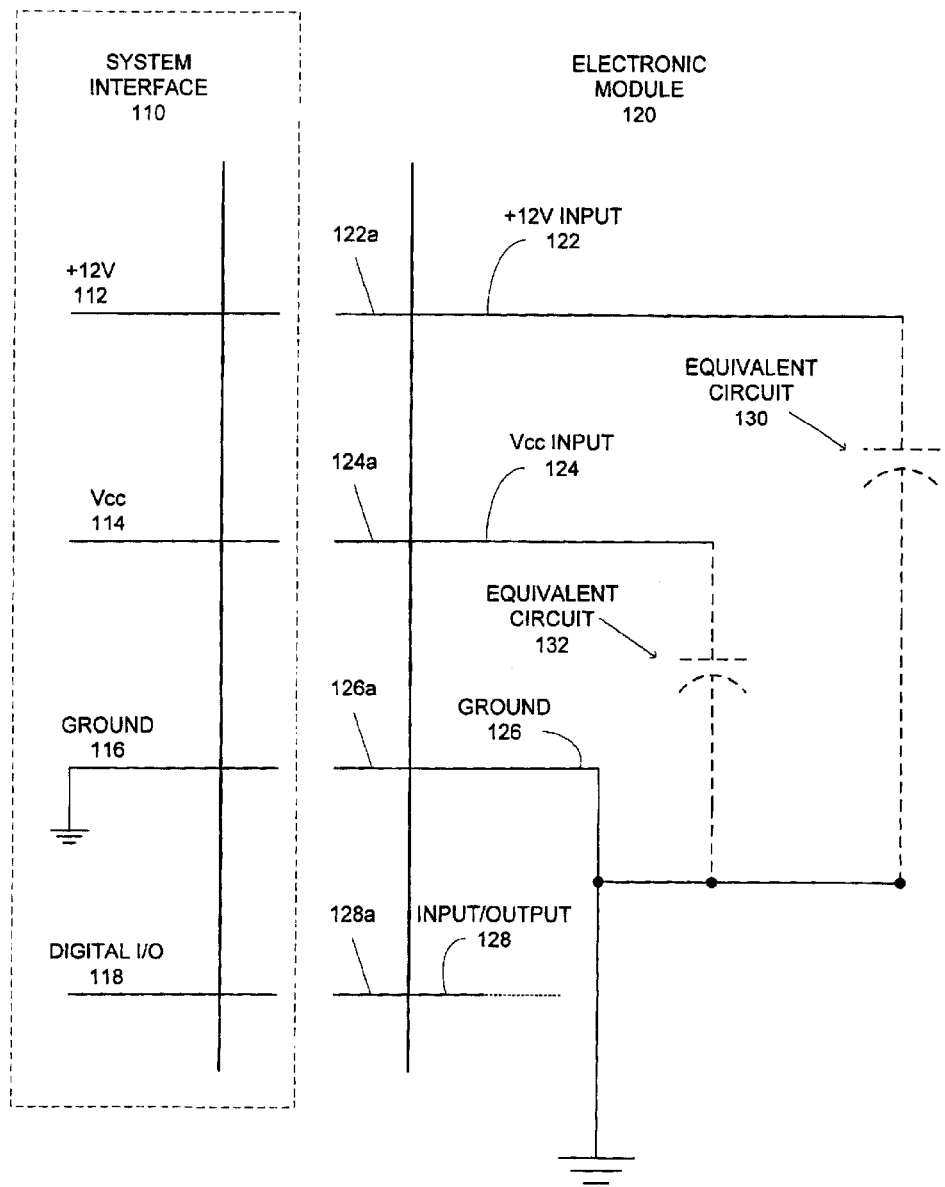
FIG. 1 is a block diagram depicting an electronic module, having non-staggered connectors, to be mated with a system interface in accordance with an embodiment of the present invention.

FIG. 1 illustrates an electronic module that, due to its non-staggered connectors, may subject the module or another component to damaging electrical current or erroneous signals. Illustratively, electronic module 120 is a computer system component that requires power (e.g., +12V) to drive a load (e.g., a fan, a display, a peripheral device) and which provides or exchanges information with the system through a data line.

In FIG. 1, module 120 is configured to interface with system interface 110, which may, illustratively, be a mid-plane assembly. Multiple connections are made between module 120 and interface 110; only a subset of those connections may be depicted in FIG. 1. In particular, interface 110 provides power connection 112, Vcc connection (e.g., +5V) 114, ground connection 116 and input/output connection 118.

Electronic module 120 includes power input connection 122, Vcc input connection 124, ground connection 126 and input/output connection 128. Each connection presents a connector of uniform length/depth for mating with the corresponding connectors of system interface 110. Thus, each of power connector 122a, Vcc connector 124a, ground connector 126a and input/output connector 128a are of the same length. The connectors of module 120 may be male or female. The connectors of interface 110 and/or module 120 may be combined in a unified, blindmate or other similar unit.

Equivalent circuits 130, 132 are shown in module 120, and may represent various types and configurations of actual circuits. Input/output line 128 may be coupled to an internal circuit or may be coupled to ground 126. For example, if input/output line 128 is merely used to inform the system as to whether module 120 is connected or not (e.g., it just provides a presence indication), then the input/output line may simply be connected to ground 126 in order to drive the line to a logic low.

Because the connectors of module 120 (and system interface 110) are non-staggered, there is no physical restriction or control over which of the connections (e.g., power, Vcc, ground, input/output) is made first. As one skilled in the art will appreciate, this may cause spurious signals to be returned to the system or may cause damage to the system, system interface 110 and/or electronic module 120. For example, if the input/output connection is made first, an out of voltage signal may be propagated to the system. Or, if the power and input/output lines are connected before ground, a dangerous level of current could be returned to the system and cause damage to, or destroy, a system component.

Figure 2:
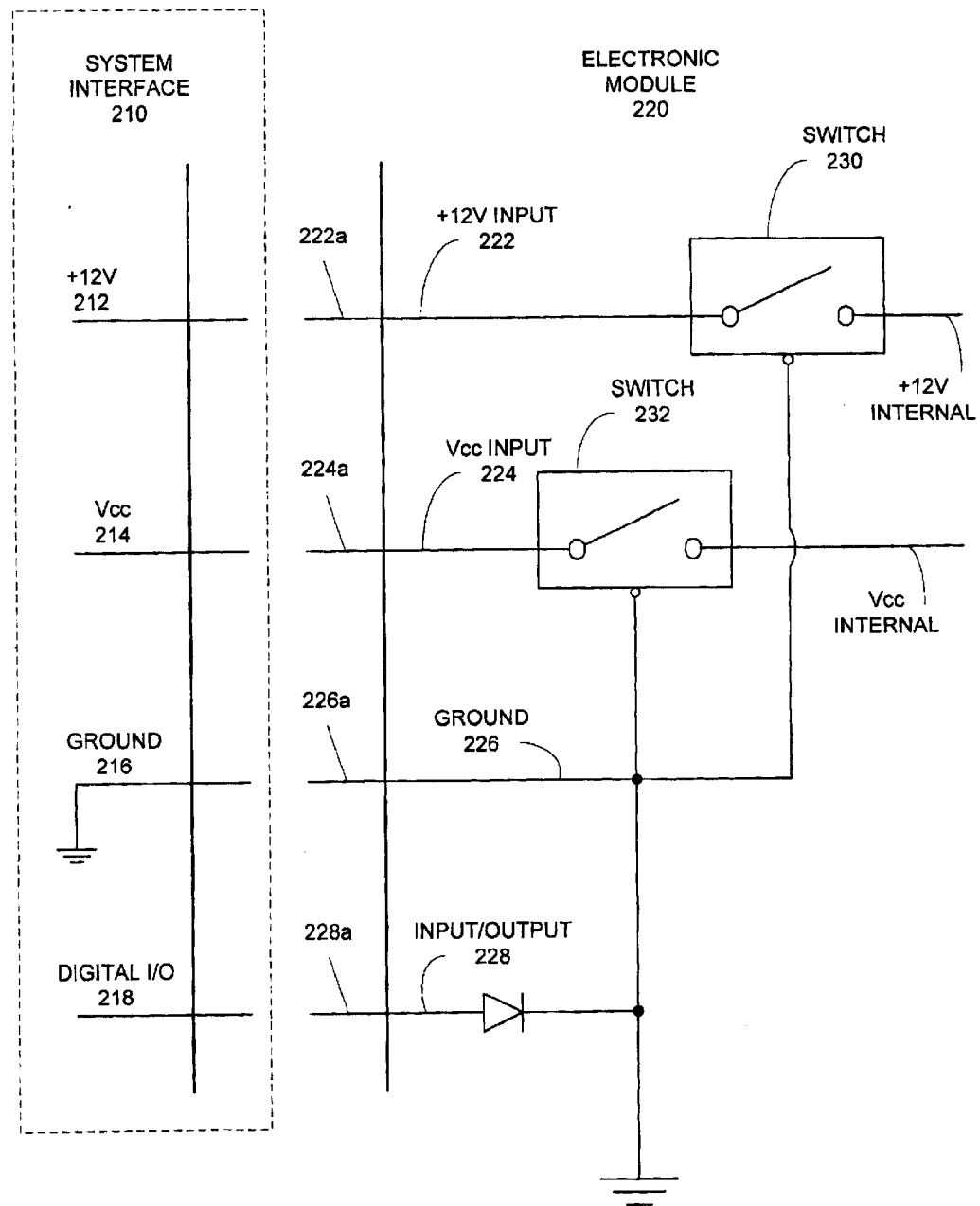
FIG. 2 is a block diagram demonstrating an electronic module configured for hot swapping, with non-staggered connectors, in accordance with an embodiment of the invention.

FIG. 2 depicts an electronic module having non-staggered connectors, which is configured in accordance with an embodiment of the invention to allow it to be hot swappable and control the order in which power, signal and/or other connections are completed.

Module 220 of FIG. 2 includes power line 222, coupled to power connector 222a, for providing power to the module. Module 220 also includes Vcc line 224 (coupled to Vcc connector 224a), ground 226 (coupled to ground connector 226a) and input/output line 228 (coupled to input/output connector 228a). The various connectors of module 220 are intended to be coupled with corresponding connectors of power line 212, Vcc line 214, ground reference 216 and input/output line 218 of system interface 210. In this embodiment, input/output line 228 provides a "present" signal to system interface 210 when the electronic module and system interface are mated, and may include appropriate elements (e.g., a rectifier) to prevent the input/output line from going lower than ground. In other embodiments, input/output line 228 may be coupled to circuitry within module 220 and may be used to carry data between the module and the system.

Connectors 222a, 224a, 226a and 228a are of uniform length or depth, and so there is no physical control over which of these connectors makes first contact with its corresponding connector of system interface 210. To ensure that the power and Vcc inputs are energized or coupled to their internal circuits, switches 230 and 232 are incorporated into module 220. Although switches are included on both power and Vcc lines in the illustrated embodiment, in other embodiments one of them may be omitted.

Gates of switches 230, 232 are coupled to ground 226, thereby keeping the switches open until ground 226 is coupled to ground reference 216.

Figure 3:
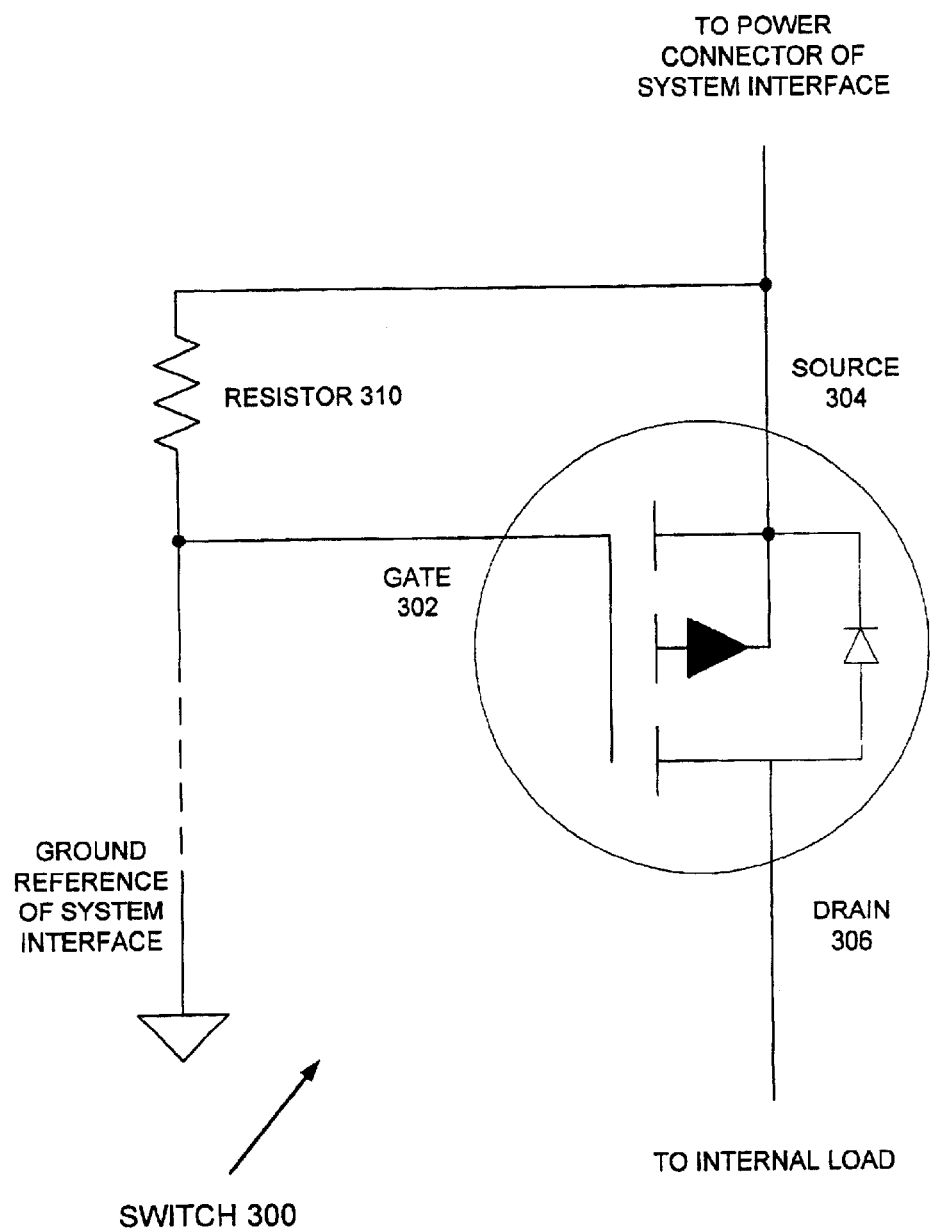
FIG. 3 depicts an apparatus for enabling an electronic module with non-staggered connectors to be hot swappable, in accordance with an embodiment of the present invention.

FIG. 3 demonstrates one configuration of a switch, such as switch 230 or 232 of FIG. 2, according to one embodiment of the invention. In this embodiment, switch 300 is a solid-state switch or a FET (Field Effect Transistor). As described above, gate 302 of switch 300 is coupled to ground, while source 304 is coupled to power (or Vcc). Drain 306 is coupled to an internal circuit of the module comprising switch 300. Resistor 310 may provide on the order of 22 kilohms of resistance.

Until gate 302 is coupled to ground the voltage drop between gate 302 and source 304 (i.e., $V_{GS}$) is 0 volts, and therefore the resistance across the switch (i.e., $R_{DS}$) is very high and switch 300 remains open. When, however, the gate is coupled to ground (e.g., the module's ground connector is coupled to a ground reference of a system interface), $V_{GS}$ becomes +/−12 volts, for example, $R_{DS}$ drops to a low resistance, and switch 300 closes. An internal circuit or load is then safely powered. In the illustrated embodiment, switch 300 may be capable of handling approximately 5A of current without being damaged.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. An electronic module for live connection with a computer system, comprising:
   a power line for receiving power from the computer system and powering a load of the electronic module;
   a ground line;
   an input/output line; and
   a switch element coupled to said power line and said ground line between said power line and the load, wherein said switch element disables said power line until said ground line is coupled to a ground of the computer system.

2. The electronic module of claim 1, further comprising:
   a power connector for coupling said power line to the computer system;
   a ground connector for coupling said ground line to the computer system; and
   an input/output connector for coupling said input/output line to the computer system;
   wherein said connectors have substantially uniform lengths.

3. The electronic module of claim 2, wherein said switch element is a solid-state switch comprising:
   a first source coupled to said power connector;
   a first gate coupled to said ground line; and
   a first drain coupled to the load;
   wherein the solid-state switch is non-conducting until said ground line is coupled to a ground reference of the computer system.

4. An electronic module with non-staggered connectors, comprising:
   a power connector configured to couple a first load of the electronic module to an interface power source;
   a ground connector configured to couple a ground line of the electronic module to the interface; and
   a switch, positioned inline between said power connector and said first load, wherein said switch is configured to electrically isolate said first load until said ground connector is coupled to the interface;
   wherein each of said power connector and said ground connector are of substantially uniform lengths.

5. The electronic module of claim 4, further comprising:
   an input/output connector configured to couple an input/output line of the electronic module to the interface;

wherein said input/output connector is of said uniform length.

6. The electronic module of claim 4, further comprising:
a logic voltage connector configured to couple a second load of the electronic module to the interface;
wherein said logic voltage connector is of said uniform length.

7. An apparatus for ensuring multiple electrical connections are completed to an interface module in a predetermined order, comprising:
a gate configured to be coupled to a ground reference of the interface module;
a source configured to be coupled to a voltage source of the interface module; and
a drain coupled to a load;
wherein the apparatus is positioned inline electrically between the voltage source and the load; and
wherein the apparatus is non-conducting, and said drain is isolated from said source, until said gate is coupled to the ground reference.

8. A computing device, comprising:
a processor;
a memory; and
a hot swappable component, comprising:
a power input configured to receive power, for powering a component load, from the computing device through a power connector;
a ground configured to receive a ground reference from the computing device through a ground connector; and
a switch configured to isolate said power input from the component load until said ground is coupled to the ground reference;
wherein said switch is positioned between said power input and the component load.

9. The computing device of claim 8, wherein said power connector and said ground connector are of substantially identical lengths.

10. The computing device of claim 8, wherein the hot swappable component further comprises:
an input/output line configured to provide information from the component to the computing device through an input/output connector;
wherein said power connector, said ground connector, and said input/output connector are of substantially identical lengths.

11. The computing device of claim 8, wherein the hot swappable component further comprises:
a logic voltage input configured to receive logic voltage from the computing device through a logic voltage connector;
wherein said power connector, said ground connector, and said logic voltage connector are of substantially identical lengths.

12. The computing device of claim 8, wherein said switch is a field effect transistor comprising:
a gate configured to be coupled to the ground reference;
a source configured to be coupled to the power input; and
a drain coupled to the component load;
wherein said field effect transistor is non-conducting until said gate is coupled to the ground reference.

13. A method of connecting a hot swappable module to an interface of a computing device, comprising:
receiving a first voltage from the computing device through a first voltage connector of the module, wherein said first voltage connector is electrically separated from a load of the module by a switch;
receiving a ground reference from the computing device through a ground connector of the module;
until said ground reference is received, isolating said first voltage connector from the load of the module; and
when said ground reference is received, enabling electrical conductivity between said first voltage connector and the load.

14. The method of claim 13, wherein said first voltage connector and said ground connector are of substantially the same length.

15. The method of claim 13, further comprising receiving a digital input/output connection from the computing device through an input/output connector.

16. The method of claim 13, further comprising receiving a second voltage from the computing device through a second voltage connector of the module.

17. The method of claim 16, wherein one of said first voltage and said second voltage is Vcc.

* * * * *